(No Model.) 2 Sheets—Sheet 1.

J. B. HURD & H. H. McLANE.
FLEXIBLE HOE AND COTTON CHOPPER.

No. 418,183. Patented Dec. 31, 1889.

Witnesses:
Clarence Hurd
E. M. C. Nichols

Inventor:
Judson B. Hurd
Hiram H. McLane
per J. B. Hurd
Attorney (No Model.) 2 Sheets—Sheet 2.

J. B. HURD & H. H. McLANE.
FLEXIBLE HOE AND COTTON CHOPPER.

No. 418,183. Patented Dec. 31, 1889.

UNITED STATES PATENT OFFICE.

JUDSON B. HURD AND HIRAM H. McLANE, OF SAN ANTONIO, TEXAS.

FLEXIBLE HOE AND COTTON-CHOPPER.

SPECIFICATION forming part of Letters Patent No. 418,183, dated December 31, 1889.

Application filed September 6, 1889. Serial No. 323,213. (No model.)

*To all whom it may concern:*

Be it known that we, JUDSON B. HURD and HIRAM H. McLANE, citizens of the United States, residing at San Antonio, in the county of Bexar and State of Texas, have invented a new and useful Flexible Hoe and Cotton-Chopper, of which the following is a specification.

Our invention relates to cultivating implements that have oscillating blades to cut across the row of plants, cutting between the hills, or thinning out the plants in the drill or row; and the objects of our improvement are, first, to provide a means by which the swinging blades are made to cut a uniform depth, and do as shallow hoeing as may be required even in rough ground, and also work very close to small plants; second, to provide such gearing and such connection between the driving-wheel and the oscillating blades that the blades may be readily shifted from right to left to keep them over the row without having to move or change the course of the driving-wheel at the same time. We attain these objects by the mechanism illustrated in the accompanying drawings, in which—

Figure 1:
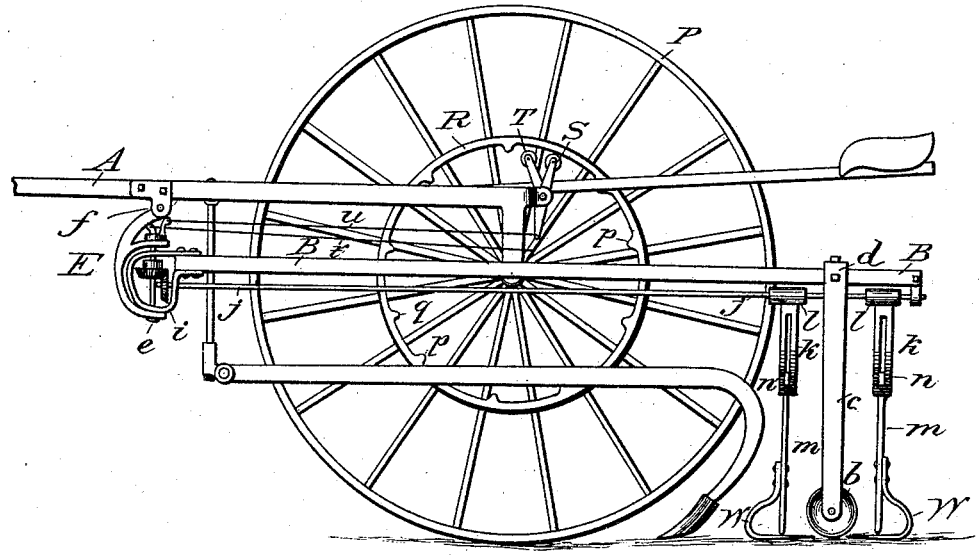
Figure 2:
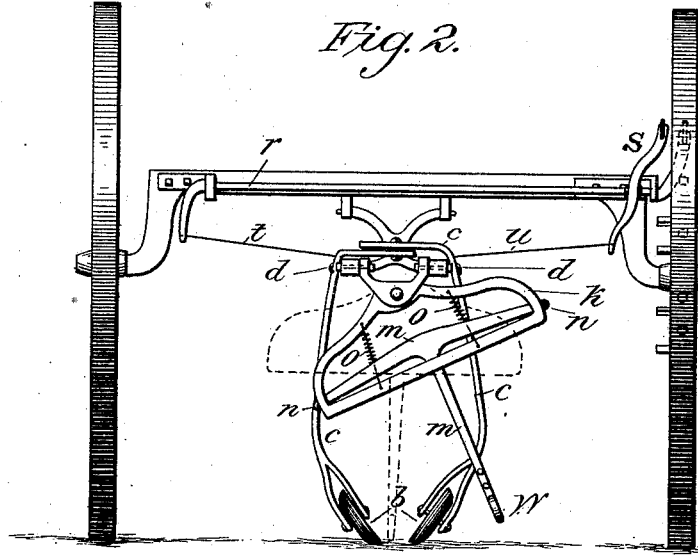
Figure 3:
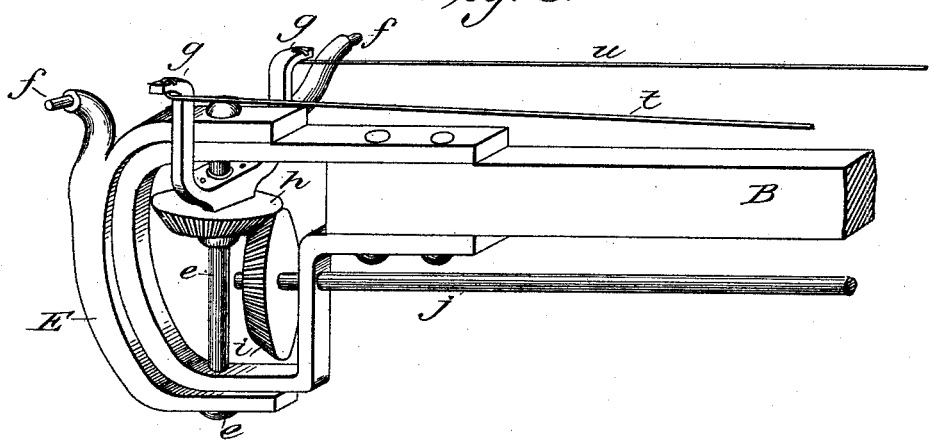
Figure 4:
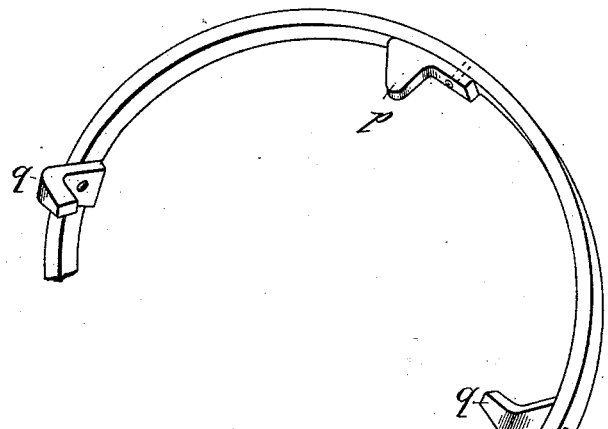

Figure 1 is a side view of the pole and one wheel of an ordinary cultivator with our cog-rim fixed to the wheel and our hoeing device attached to the pole. Fig. 2 is a rear view of the same with both wheels of the cultivator. Fig. 3 is a detailed view of the joint, and Fig. 4 a detailed view of a portion of the cog-rim.

Similar letters refer to similar parts throughout the several views.

The running-gear, tongue, seat, and general frame-work of our machine may be similar to those of an ordinary riding-cultivator. Indeed, the parts we claim as new may be readily attached to the frame and wheels of a cultivator or other wheeled implement.

Under the main pole A we suspend the front end of a horizontal beam or frame B, the other end being supported by a pair of wheels $b\,b$. These wheels are intended to run on each side of the row of plants and very close to it, but are set with their tops leaning out from each other, so as to allow more room for the tops of the plants to pass between them. They are also set with their fronts facing a little toward each other, so that the right-hand wheel is inclined to run to the left and the left-hand one to the right. This position renders them easily shifted from side to side, as may be necessary to keep exactly over the row as the implement passes forward. The shanks $c\,c$, on which these gage-wheels run, are curved out as they extend upward, so as to allow greater room for the bushy tops of plants to pass between them, and, besides being bolted onto the side of the frame at $d\,d$, they lap over onto each other and are bolted together on top.

The forward end of the frame B is attached to the pole of the implement by the use of a joint E, which has two axes—one vertical where the bolt $e$ is placed and the other lateral, being formed by the two pivots $f\,f$. This joint is so formed that these axes will cross each other at right angles, and the ends of the arm $g$, which is rigidly fixed to the cog-wheel $h$, should come on a line with the lateral axis $f\,f$.

The beveled cog-wheel $h$ turns freely on the bolt $e$; but the other cog-wheel is rigidly fixed to the longitudinal shaft $j$. The rear end of this shaft has a loose bearing in the rear end of the frame B, and on this shaft the two knife-frames $k\,k$ are rigidly fixed by means of the set-screws $l\,l$. These knife-frames $k\,k$ are provided with slots in their sides and in the bottom piece, in which slots the cross-formed knife-shank can freely slide up and down, but has a resting place at the lower corners of the frame $k$, and is held from sliding sidewise by the pins $n\,n$ in the ends of this cross-piece. The springs $o\,o$ hold this cross-piece normally against the lower part of the frame.

The rim R, which is provided with a number of cogs, is securely fastened to the wheel P to form a driving-wheel. There are two styles of cogs which alternate each other on the rim R. One set of cogs $p\,p$ project from the inner surface of the rim and extend directly toward the center and engage the crank $r$. The other set of cogs $q\,q$ project laterally from the rim, say an inch or two, and then turn down to engage the other lever. The crank $r$ extends nearly the whole length of the arched axle of the cultivator, the one end being turned up to engage the cog $p$ and the other end turned down to receive the rod

*t*. The lever *s* pivotally swings upon the lateral portion of the crank *r*, its upper end extending upward to engage the outwardly-projecting cogs *q q*, and the other end extending down to receive the rod *u*. The forward ends of the rods *t* and *u* are loosely connected with the ends of the arms *g*. When the wheel P revolves and the cog *p* comes in contact with the end of the crank *r* to move it forward, this motion is conveyed by means of the rod *u*. The bevel-gearing and the longitudinal shaft *j* to the knife-frames *k k* and the knives or hoeing-blades *w w* are made to swing across the plant-row and destroy the weeds or surplus plants in their way. This motion also throws the upper end of the lever *s* back, ready to be engaged by the cog *q*, and this as it passes throws the blades *w w* back across the row. When the blades in passing from side to side meet with any elevation or depression in the surface of the ground, the springs *o o* enable them to accommodate themselves to such unevenness.

We are aware that cotton-choppers are made having oscillating blades that move from side to side across the row; but these blades being supported by wheels that run at some distance from the row, a little unevenness in the ground immediately at the row will cause them to cut too deep or to swing across the row without cutting at all.

It is desirable to chop or thin out cotton when the plants are very small and tender, and it is necessary to work very close to the plants. When the work is done by hand, the surface is merely scraped with a sharp hoe, which is sufficient to destroy the surplus plants and young grass or weeds. A deeper cut with the blade close to the plant intended to be left will disturb the soil around its roots and cause it to die. We use a pair of gage-wheels of such size and form and so set that they may be run very close to and on each side of the plant, so as to protect it from being covered by any dirt or trash that the machine may set in motion, and while they hold the crust from being disturbed around the roots of the plant to be saved and cultivated they allow the blades to pass one before and one behind and partly under them, and thereby insure a very uniform depth of cut, and permit very close work; and in order to further insure that the blades shall do only surface work, but shall vary exactly with every little variation of the surface, the blades are provided with cross-formed shanks *m*, before referred to, which shanks are allowed to move up and down in the slots of the frame, whereby the blades *w w*, when they strike the ground in their lateral motion, are pulled over it, the point of draft being at the pin *n*, which is in advance of the blade. The spring *o* on the opposite side of the frame allows the blade to give up and down to correspond with any unevenness and insure the same motion and the same results as when the hand-hoe is scraped over the surface of the ground.

Other cotton-choppers have been invented with driving-wheels; but where the wheel and the hoeing or chopping device are on the same frame when the operator wants to shift the hoeing device a little to the right or left, to correspond with a crook in the row, he must move the wheel also; but we, by the use of the joint E, above described, allow the frame B with all the hoeing device liberty of motion, both lateral and vertical, independently of the driving-wheel and without changing their essential relation to each other. Thus we are enabled to have a driving-wheel as large and as heavy as may be necessary to operate the blades and to help carry the weight of the operator and of the other parts of the machine.

Having thus described our invention, we claim as new and desire to secure by Letters Patent—

1. In a cotton-chopper, a pair or series of gage wheels or disks that support the swinging-blades and are set in an oblique and angular position and in the relation to each other and to the plant and to the blades, substantially as described, and for the purposes specified.

2. In a cotton-chopper, the combination of one or more oscillating blades arranged to operate in conjunction with gage-wheels and pass in their lateral motion partly under the face of said wheels, as shown and described, and for the purposes specified.

3. In a cotton-chopper, the joint E, in combination with a set of beveled gearing which communicates the motion of the driving-wheel to the chopping device, said joint having two axes crossing each other at right angles, as shown and described, and for the purposes specified.

4. In a cotton-chopper, the combination, with the knife-frames *k* or their equivalent, of one or more laterally-moving oscillating blades having a joint in connection with the blade-shanks, the knife-frames and springs *o* or other equivalent, which gives said blades a degree of flexibility, as shown and described, and for the purposes specified.

5. In a flexible hoe and cotton-chopper, the hoeing-frame B, the gage-wheels *b b*, the joint E, cog-rim R, crank *r*, and lever *s*, rods *t* and *u*, arms *g g*, beveled cog-wheels *h* and *i*, shaft *j*, knife-frames *k k*, blade-shanks *m m*, and blades *w w*, substantially as shown and described, and for the purposes specified.

JUDSON B. HURD.
HIRAM H. McLANE.

Witnesses:
H. C. HURD,
ELLEN M. C. NICHOLS.